G. P. MacGOWAN.
PORTABLE BABY CARRIER.
APPLICATION FILED MAY 17, 1919.

1,366,405.

Patented Jan. 25, 1921.

INVENTOR
George P. MacGowan
BY William P. Hammond
ATTORNEY

UNITED STATES PATENT OFFICE.

GEORGE P. MacGOWAN, OF NEW YORK, N. Y.

PORTABLE BABY-CARRIER.

1,366,405.  Specification of Letters Patent.  Patented Jan. 25, 1921.

Application filed May 17, 1919. Serial No. 297,778.

*To all whom it may concern:*

Be it known that I, GEORGE P. MAC-GOWAN, a citizen of the United States, residing in the borough of Manhattan, city, county, and State of New York, have invented certain new and useful Improvements in Portable Baby-Carriers, of which the following is a specification.

The present invention relates to a portable baby carrier and more particularly to certain improvements in supporting means therefor. The invention comprehends a new and novel form of adjustable and collapsible supporting frame, adapted to support the carrier in a readily detachable position upon the back of a vehicle seat or bed structure and the like, or upon the floor, as circumstances may require.

One of the objects of the invention is to form the supporting frame in such a manner as to permit of those portions, which function to support the carrier in upright position upon a floor or support, to be readily removed and other portions of the supporting frame which function to hold the carrier in supported position from the back of a seat or bed structure, to be readily collapsed in order that the carrier can be dropped or folded back against such support, so as to be out of the way when not in use, without removing the carrier from the seat or bed structure support.

A still further object of the invention is to provide an adjustable supporting means, whereby the carrier may be held in a horizontal position irrespective of the angularity of the seat back or bed structure which supports the same.

Other objects of the invention will manifest themselves upon a reading of the following specification, reference being had to the accompanying drawings, in which I have illustrated by way of example, one preferable embodiment of the principles of the invention, and in which—

Figures 1, 2:
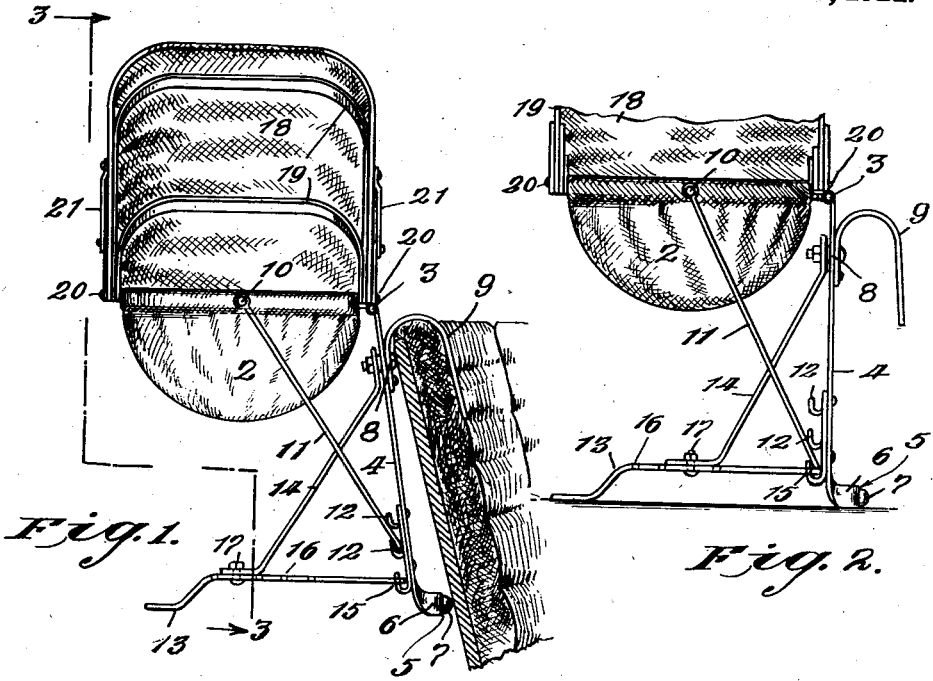
Figure 1 is an end view of the carrier and supporting frame structure, a part of the seat structure being broken away and in cross section to illustrate the invention more clearly.
Fig. 2 is a similar view showing the supporting frame in the position assumed when acting as a support for the carrier when resting upon the floor.
Figure 3:
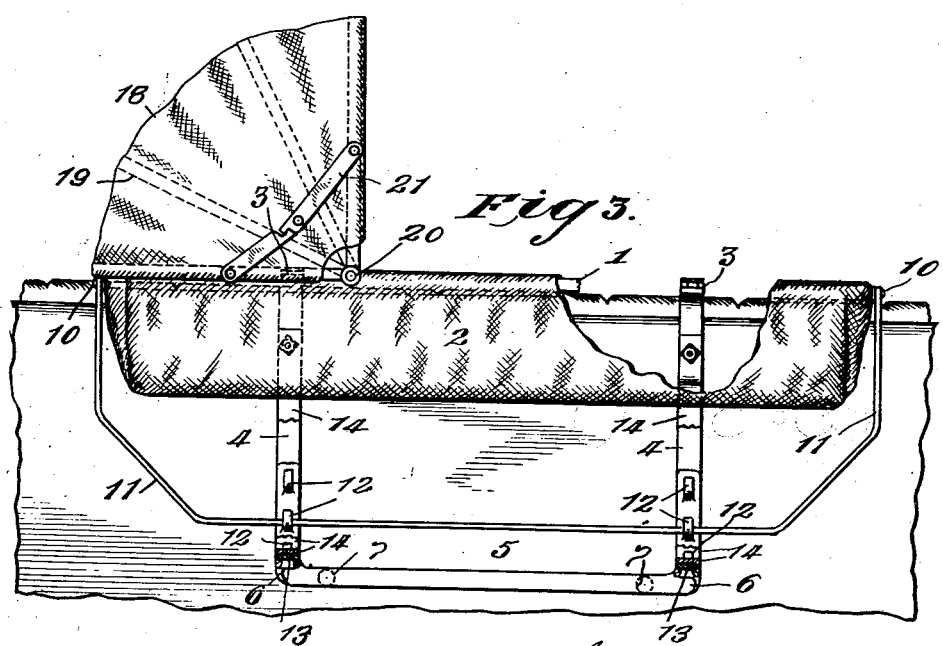
Fig. 3 is a view in side elevation, part of the basket being broken away to illustrate certain details of construction.

The carrier consists of a basket supporting frame 1, preferably formed of flat strip metal stock, to which the fabric 2 forming the basket is fastened by suitable stitching or otherwise. Hingedly fastened as at 3, and depending from one side of the basket frame are a pair of parallel arm members 4, which at their lower extremity terminate in a unitary cross connecting member or arm 5. The arms 4 and cross connecting member 5 are joined together by curved sections 6, formed by bending the flat strip metal, of which they are formed, in such a manner that the cross connecting member 5 will be on edge, the flat surface thereof being in the same plane as the depending arms, so as to provide for the accommodation of the rubber buffing members 7, which may be riveted or otherwise suitably fastened thereto, these serving to prevent marring of any highly polished surface with which they might contact. Fastened at 8 to the arms 4 are a pair of metal hook members 9, which serve to straddle the upper portion of the seat or bed structure or the like, upon which the carrier is to be supported.

Fastened at opposite ends of the basket and preferably substantially at a point through the longitudinal axis and swiveled thereto as at 10 is a substantially U-shaped supporting member 11, which has a detachable connection with the hook members 12 carried by the supporting arms 4. These hook members are several in number and are attached in vertical series of varying heights so that the carrier may be so adjusted as to assume a perfectly horizontal position even though the back of the seat structure or support is at an angle to the vertical. For instance, in Fig. 1 there is illustrated a seat structure having an inclined back. In this instance, when the carrier is hooked over the top of the seat, the weight of the carrier and frame structure causes the arms 4 to swing from the vertical inwardly until the buffers 7 contact with the seat back. By arranging the supporting member 11 in the hook at the proper elevation, the carrier can be made to assume a perfectly horizontal position. In lieu of these series of independent hooks, I may provide a pair of adjustable hooks arranged to be readily adjusted in a vertical direction, up and down, the arms 4, as necessary.

As thus far described, the supporting frame supports the carrier in its proper position when suspended from a support such as a seat or bed structure and when used in this way, the carrier serves its intended function in an efficient manner. Owing to its readily detachable feature, the utility of the carrier when used in connection with a bed is obvious since it may be readily swung from the bed inwardly so as to economize on space, which ofttimes is desirable without disturbing or interfering with the baby.

It will be understood that as the member 11 is fastened to the basket frame by swiveled connections and the basket fastened to the supporting arms 4 by hinges, it will be apparent that upon lifting the member 11 from the hooks 12, the basket and the member 11 are permitted to swing into a compact position substantially parallel with the seat or support structure, and thus be out of the way.

In order to permit of the carrier being readily detached from the vertical support and be supported in an upright position upon the floor, I provide a pair of horizontally extending leg members 13, these being detachably fastened to the arms 4 by struts 14 and their apertured ends 15 coöperating with the lower hook member 12 in a manner thought to be clear from the drawing. The legs 13 are provided with a series of spaced holes 16 so that suitable adjustment can be made by means of screw-threaded bolts and retaining nuts 17, which becomes necessary when the supporting frame of the carrier has been adjusted to coöperate with a seat or bed structure having an inclined back. This is clearly illustrated in Fig. 1. The carrier is provided with a folding fabric top 18, bows 19 being pivoted to the main frame of the basket as at 20. Any suitable adjustable means, such as arms 21, may be provided for holding the top taut when in its fully opened position.

It will be apparent from the foregoing description that an adjustable supporting frame structure embodying these principles is of great utility since it permits of the carrier being either supported from an upright, vertical or angular support, or from a horizontal support, as desired, and the change from one position to the other can be made expeditiously and with little effort.

The carrier will serve equally useful in connection with the seat structure of an automobile, railroad coach, or other vehicle, and is particularly adaptable for home use when supported by the head or foot boards of a bed, whether extending outwardly therefrom or inwardly over the bed and, when used in connection with an automobile or other vehicle, it possesses the added advantage that it may be readily removed when the car stops and placed upon the ground without disturbing the occupant.

While I have shown and described but one specific embodiment of the principles of my invention, I do not wish to be restricted in the matter of details but intend to cover such principles in whatever form they may be embodied.

Having thus described my invention what I claim as new herein and desire to secure by Letters Patent is:

1. A carrier attachment of the character described, comprising supporting means adapted to coöperate with a substantially upright support, and supporting means carried by said first-mentioned supporting means for supporting the carrier in an upright position when removed from the upright support and placed upon a horizontal support, said second-mentioned supporting means being angularly adjustable with respect to said first-mentioned supporting means.

2. A carrier attachment of the character described, comprising a basket supporting frame, a supporting bracket for said frame, said bracket comprising vertical supporting arms hingedly connected to said basket frame and having means adapted to extend over the top of a vertical structure for supporting the carrier in operative position, foot members extending horizontally from said vertical supporting arms for supporting the carrier upon a horizontal support, and means for angularly adjusting said foot members with respect to said vertical supporting arms.

3. In a carrier of the character described, the combination of a frame, vertical supporting arms connected with said frame and provided with means to support the frame upon an upright support, and horizontally disposed members extending outwardly from said vertical supporting arms to support the frame upon a horizontal support.

4. In a carrier of the character described, the combination of a basket supporting frame and supporting means therefor, said supporting means including a frame having upper and lower support engaging means for hanging said basket supporting frame upon a substantially upright support or for supporting the same upon a horizontal support, and adjustable means swivelly connected to said basket supporting frame and engaging said second mentioned frame intermediate said upper and lower support engaging means.

5. In a carrier of the character described, the combination of a basket supporting frame and supporting means therefor, said supporting means including a frame having upper and lower support engaging means for hanging said basket supporting frame upon a substantially upright support or for supporting the same upon a horizontal support, and means swivelly connected to said basket supporting frame and adapted to engage said second mentioned frame at any one of a plurality of points intermediate said upper and lower support engaging means.

6. In a carrier of the character described, the combination of a frame, vertical supporting arms connected with said frame and provided with means to support the frame upon an upright support, and horizontally disposed members extending outwardly from said vertical supporting arms and adjustably secured thereto to support the frame upon a horizontal support.

7. A carrier attachment of the character described, comprising a basket supporting frame, a pair of arms horizontally attached thereto and depending therefrom, a pair of metal hook members carried by said arms and adapted to hook over a support, a member swivelly connected to the basket frame and detachably connected with the arms at their lower extremity, foot members extending horizontally from the lower extremities of said arms and braces extending from the foot members adjacent the opposite extremities of the other of said arms.

8. A carrier attachment of the character described, comprising a basket frame, a pair of upright supporting arms attached to said frame at spaced points, a supporting member swivelly connected to the said basket frame centrally of its ends, said member coöperating with the lower extremities of the said upright supporting arms for supporting the basket in horizontal position, foot members extending outwardly from the said supporting arms, and angular brace members extending between the foot members and the upper extremities of the supporting arms.

9. A carrier attachment for vehicles comprising a basket frame, a depending arm support therefor, horizontally attached thereto, a hook member fastened to the depending arm, said hook member adapted to straddle the upper edge of a supporting structure, a bumper instrumentality carried adjacent the lower extremity of said arm and adapted to engage the surface of the supporting structure, an arm support angularly disposed to said first-named supporting arm and having swiveled connection with the basket frame at one end and having detachable connection with the first-mentioned arm at its lower extremity, means for associating said arms adjacent their lower extremities for varying points along said first-mentioned arm, a foot member having detachable connection with the lower extremity of the first-mentioned arm and extending therefrom substantially the width of the basket frame, and a strut member detachably and adjustably connected with the foot member, at one end, and rigidly fastened to the first-mentioned arm at the upper extremity of said first-mentioned arm.

GEORGE P. MacGOWAN.